Figure 1:
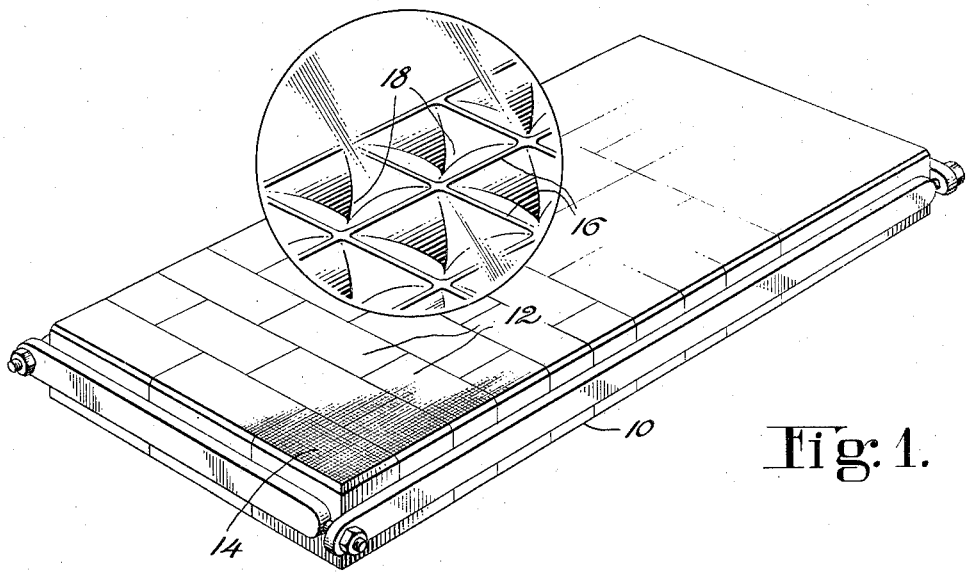

April 26, 1938.   H. L. GLIDDEN   2,115,507
CUTTING BLOCK
Filed Aug. 29, 1935

INVENTOR:
Harvey L. Glidden
By his Attorney
Victor Cobb

Patented Apr. 26, 1938

2,115,507

UNITED STATES PATENT OFFICE 2,115,507

CUTTING BLOCK

Harvey L. Glidden, Lexington, Mass., assignor to United Shoe Machinery Corporation, Paterson, N. J., a corporation of New Jersey Application August 29, 1935, Serial No. 38,427

3 Claims. (Cl. 164—58)

This invention relates to cutting blocks, and is herein illustrated in connection with blocks adapted for use in clicking machines in cutting blanks from sheet material such as leather by means of cutting dies.

In producing blanks, such as various shoe part blanks, extensive use has been made of clicking machines which comprise a cutting block and a presser arm, movable laterally over the block, and arranged for reciprocation relatively thereto to force a freely movable die through sheet material positioned upon the block thereby to cut out a blank.

Cutting blocks employed in clicking machines commonly comprise pieces of hard wood, such as rock maple, glued together with the grain of the wood extending heightwise of the block and having a face planed across the grain to form a substantially smooth work-supporting or cutting surface. New cutting blocks of this type are not generally satisfactory for cutting purposes until they have been broken in, which takes from a few days to several weeks depending upon the skill of the operator and the character of the work being operated upon. The breaking in of new blocks slows production and makes it necessary for the operator to exercise great care in order to produce perfect blanks.

The difficulties heretofore experienced in using new blocks arise, I believe, from the fact that the surface layers of a new block are not sufficiently resistant to penetration and do not adequately support the work against the pressure of the edge of the die. For example, if the arm of the machine is adjusted so that the die penetrates the block only slightly, it frequently happens that the edge of the die forces some of the material below it into the block without completely severing the material, thus producing a blank with a ragged edge. On the other hand, if the arm is set to drive the die into the block to a depth at which the resistance of the block results in the forcing of the cutting edge through the material, the die sticks, causing the operator to lose time in removing it. In such cases, particularly in operating upon thin materials having a high finish, the material may be carried so far into the block as to destroy the finish along edge portions of the blank formed.

It is to be noted that in performing successive cutting operations a skilled operator will place the die so as to cut upon different portions of the block, with the result that the entire available block face is gradually broken in, and that upon continued operations the block face will wear down evenly. However, due to the sticking of dies and to the care required to produce perfect blanks when using a new block, many operators will break in a small portion only of the block surface with the result that a depression is formed as the block wears down. In such instances, it eventually becomes necessary to trim the remaining portions of the block down to the level of the bottom of the depression thus wasting a substantial amount of unused block material.

In view of the foregoing, it is an object of the invention to provide as an article of manufacture a cutting block the work-supporting or cutting face of which does not require breaking in. To this end, and as illustrated, the invention provides as an article of manufacture a novel cutting block having a work-supporting face which comprises a large number of small projections extending from the body portion of the block. These projections operate to support sheet material to be cut at intervals below the edge of a die as it is forced down against or through the material so that the cutting action, or at least the last part thereof, does not take place along the entire edge simultaneously. As a result of this, the cutting edge passes through the material more readily than would otherwise be the case, and the blank is completely severed without any necessity for forcing the die into the block so far that it will stick. This makes it possible to cut perfect blanks readily upon any portion of the face of a new block.

The invention further contemplates the provision as an article of manufacture of a cutting block of cellulosic material such as wood, the layers constituting the work-supporting face of which are highly condensed. The dense surface layers resist penetration of the block by the material being operated upon or by the die thus rendering the block face effective in the cutting operation with little or no breaking in and making it possible to cut perfect blanks without loss of time occasioned by dies sticking in the block. Furthermore, wood blocks provided with condensed cutting faces are resistant to penetration by moisture along the grain of the wood so that there is little likelihood of checking.

Blocks constructed in accordance with the invention and having highly condensed cutting surfaces composed of small projections have been used with excellent results. It is to be noted that after new blocks provided with such projections, or with a condensed face, or with a combination of the two, have been in use for some time the continued action of the cutting dies breaks up the material immediately beneath the surface of the block and compresses it thus placing it in condition to form a new cutting surface as the original surface wears down.

Other features of the invention are illustrated in the accompanying drawing, are described in the following detailed specification, and are pointed out in the claims.

Figure 2:
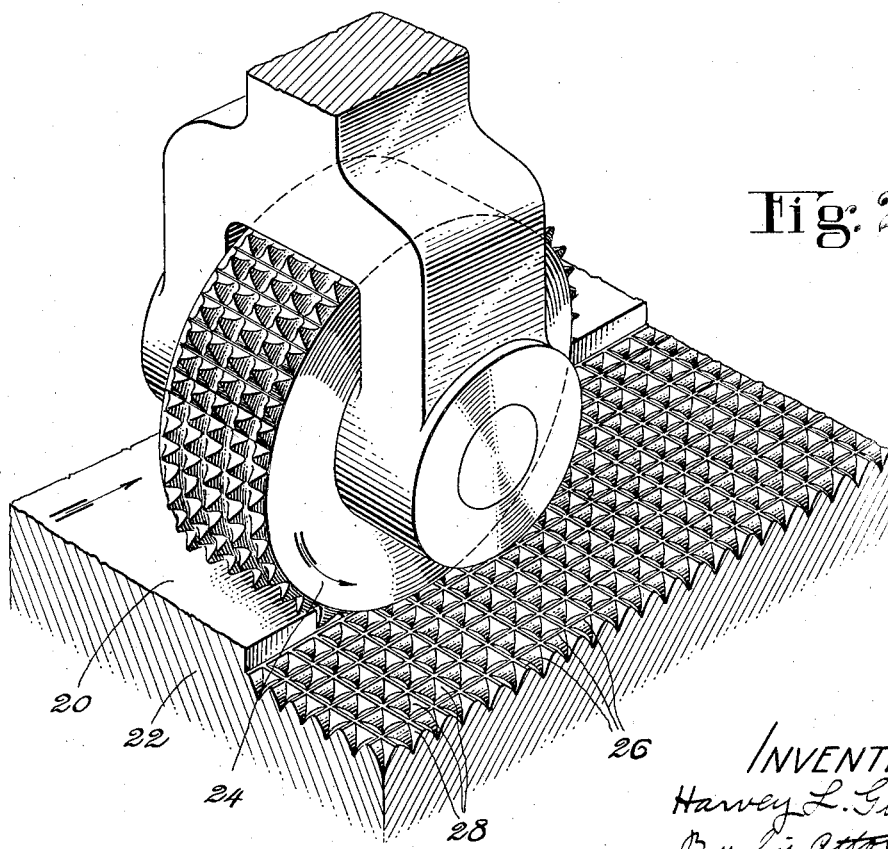

In the drawing,

Fig. 1 is a perspective view of a cutting block, illustrating one embodiment of my invention, and having a portion thereof shown on an enlarged scale to illustrate surface details; and Fig. 2 illustrates a method of preparing the surface of the cutting block shown in Fig. 1.

For purposes of illustration the invention will be described in connection with wood blocks of the type commonly used as cutting beds in clicking machines or other presses for dieing-out blanks from sheet material such as leather or fabric. Fig. 1 discloses such a block, 10, comprising a plurality of wood sections or smaller blocks 12 glued together with the grain of the wood extending in the same general direction heightwise of the block and having a flat work-supporting face 14 extending across the grain and which, in accordance with the invention, is composed of a large number of small projections or ridges 16 and recesses 18.

Preferably, the method of forming the projections as illustrated in Fig. 2, consists in subjecting the face 20 of an untreated block such as block 22 to the action of a serrated tool such as the knurled roll 24 applied under a pressure of several hundred pounds per square inch. The tool is moved back and forth transversely of the face of the block until the entire face has been treated, the operations being performed one or more times as may be required to obtain a cutting surface of the desired density. Two such treatments of the block are ordinarily sufficient. This treatment produces a work-supporting face which is highly compressed and which is composed of a large number of small projections or ridges 26 and adjacent depressions 28. Preferably, the surface layers of the block face are compressed to a depth of about $\frac{3}{16}$ of an inch so that they are of much greater density, preferably at least 30% greater, than that of the material forming the main body portion of the block.

As a result of the breaking up and condensing action upon the surface layers of a block treated as above described, such surface layers are rendered highly resistant to the penetration of material to be operated upon and to the edge of a die with the consequent result that an operator is enabled to obtain clean cutting of material upon any portion of the face of the block without breaking it in as has heretofore been necessary. Furthermore, in the use of blocks thus treated it has been found that there is less tendency for the block material in contact with the edge of a die after it has been forced into the block to have such frictional engagement with the walls of the die as to cause it to stick in the block. This contributes to the efficiency of the cutting operation in that it avoids any necessity for the operator to waste his time in loosening a die which has stuck in the block. The condensing of the surface layers results in the partial destruction of the cell-structure of the wood forming the face of the block, rendering it, to a large extent, impervious to moisture. This reduces the likelihood of checking of the wood following changes in temperature and humidity.

In the use of a block which has been treated as above described, sheet material is placed on the cutting face thereof, a die is located upon the material, and pressure is applied to the die, usually by means of the presser arm of a clicking machine, thereby to force the die through the leather and partially into the block to produce a blank. Because of the fact that the surface layers of the block have been condensed they resist the entrance of the die into the block and, at the same time, support the sheet material adjacent to the line of cut so that the material is readily severed. The projections are effective during the cutting action to support the lower layers of the material being cut so that the resistance to passage of the die through those layers is concentrated at scattered points along the edge of the die rather than along the entire edge thereof, producing a series of progressive shearing cuts which facilitate the complete severing of the material.

It is to be noted that continued operations upon the cutting faces of a treated block will result in the gradual breaking up and compressing of the layers of material below the prepared face so that as the block wears down it will always present to the operator a broken-in cutting surface. Because of the great density of the original block face wear is comparatively slow with the result that the layers immediately below the face become thoroughly conditioned before they are exposed, and are likewise slow to wear away. This contributes materially to the life of the block.

The invention has been illustrated in connection with wood cutting blocks and a method of preparing the same but it is to be understood that the invention is also applicable to blocks made of other materials such as fiber or rubber composition. It is to be noted further that other methods of preparing block surfaces within the scope of the invention have been found to be satisfactory. For example, the invention further contemplates as an alternate method one which consists in preparing a block face by rolling it with a plane cylindrical roll under high pressure, and also one which consists in breaking up a block face by subjecting it to the action of a slitting or scoring tool.

The term "preformed" appearing in the appended claims refers to a cutting surface area which is deliberately formed other than by the result of the use of the ordinary block in the normal manner.

Having described my invention, what I claim as new and desire to secure by Letters Patent of the United States is:

1. As an article of manufacture, a cutting block comprising a body portion composed of cellulosic material having a distinct grain extending in one general direction, said cutting block having a preformed cutting area arranged transverse to the direction of the grain of said block, and said preformed cutting area having a multiplicity of projections and indentations and a density greater than the body portion of said block.

2. As an article of manufacture, a cutting block comprising a body portion composed of wood, the grain of which extends in a direction heightwise of the body portion, said cutting block having a preformed cutting area arranged transverse to the direction of the grain of said block, and said preformed cutting area being made up of a multiplicity of relatively small projections having a density greater than the wood of said body portion.

3. As an article of manufacture, a cutting block comprising a body portion composed of cellulosic material having a distinct grain extending in one general direction, said cutting block having a preformed cutting area arranged transverse to the direction of the grain of said block, and said preformed cutting area having a knurled surface of greater density than the body portion of said block.

HARVEY L. GLIDDEN.